(12) United States Patent
Suit

(10) Patent No.: US 10,616,127 B1
(45) Date of Patent: Apr. 7, 2020

(54) DYNAMIC RESOURCE ALLOCATION OF CLOUD INSTANCES AND ENTERPRISE APPLICATION MIGRATION TO CLOUD ARCHITECTURE

(71) Applicant: Open Invention Network LLC, Durham, NC (US)

(72) Inventor: John Michael Suit, Mount Airy, MD (US)

(73) Assignee: Open Invention Network LLC, Durham, NC (US)

( * ) Notice: Subject to any disclaimer, the term of this patent is extended or adjusted under 35 U.S.C. 154(b) by 443 days.

(21) Appl. No.: 14/097,367

(22) Filed: Dec. 5, 2013

(51) Int. Cl.
*H04L 12/911* (2013.01)
(52) U.S. Cl.
CPC .................................... *H04L 47/70* (2013.01)
(58) Field of Classification Search
CPC ............... H04L 29/08144; H04L 29/06; H04L 29/08072; H04L 29/08171; H04L 12/5695; H04L 47/70; G06F 15/173; G06F 15/177
USPC ........................................ 709/226, 223–224
See application file for complete search history.

(56) References Cited

U.S. PATENT DOCUMENTS

| | | | | |
|---|---|---|---|---|
| 6,959,265 B1 * | 10/2005 | Candela | ............... | G06F 11/3409 370/254 |
| 8,423,646 B2 * | 4/2013 | Jamjoom | ............... | G06F 9/5077 709/203 |
| 8,719,627 B2 * | 5/2014 | Watson | ............... | G06F 11/3442 714/13 |
| 9,104,461 B2 * | 8/2015 | Neary | ................ | G06F 9/45558 |
| 2009/0055507 A1 * | 2/2009 | Oeda | ..................... | G06F 9/4856 709/216 |
| 2009/0300210 A1 * | 12/2009 | Ferris | .................... | G06F 9/5077 709/235 |
| 2010/0287263 A1 * | 11/2010 | Liu | ........................ | G06F 9/5088 709/224 |
| 2010/0318609 A1 * | 12/2010 | Lahiri | ..................... | G06F 9/455 709/205 |
| 2013/0097203 A1 * | 4/2013 | Bhattacharjee | ....... | G06F 21/604 707/783 |

* cited by examiner

*Primary Examiner* — Philip C Lee
*Assistant Examiner* — Patrick F Ngankam

(57) ABSTRACT

Cloud migration may be performed by identifying applications that are currently operating in the enterprise and performing certain determinations as to whether those applications are proper candidates for the migration to the cloud. One example method of operation may provide identifying at least one application operating on an enterprise network, retrieving current usage data of the at least one application, comparing the current usage data of the at least one application to a threshold amount of usage data to determine whether the application has exceeded the threshold amount of usage data. Next, the creation of an instance process may be performed on an entity operating outside the enterprise network and the application may be operated via the instance process and otherwise terminated in the enterprise network to alleviate resources.

15 Claims, 6 Drawing Sheets

DYNAMIC RESOURCE ALLOCATION OF CLOUD INSTANCES AND ENTERPRISE APPLICATION MIGRATION TO CLOUD ARCHITECTURE

TECHNICAL FIELD OF THE APPLICATION

This application relates to a method and apparatus of cloud computing migration and more specifically to migrating resources dynamically to cloud instances and corresponding cloud architecture.

BACKGROUND OF THE APPLICATION

Conventionally, cloud computing is an outsourced and often-time remote enterprise function that does not easily integrate into the working models of an existing computing platform, network or other enterprise configuration.

Currently, traditional enterprise networks may include various nodes that contribute to an overall business process or processes. The network nodes may include both physical and cloud-based machines. Enterprise networks may include cloud computing machines and physical hosts, which are required to provide an allocation of resources.

Enterprise networks may also include cloud resources/machines and physical host devices which are required to provide an allocation of resources. Physical hosts may include hardware devices that provide certain services, such as physical storage, which may be converted to cloud storage and allocated to corresponding cloud machines or cloud spaces (e.g., virtual cloud machines) depending on the anticipated requirements of an observed use of such cloud functions. The balance between actual physical storage and physical processing and allocated cloud storage and cloud processing usage may be optimized by monitoring and identifying the activities and functions performed in the enterprise network environment.

SUMMARY OF THE APPLICATION

One embodiment of the present application may include a method that provides identifying at least one application operating on an enterprise network, retrieving current usage data of the at least one application, comparing the current usage data of the at least one application to a threshold amount of usage data to determine whether the application has exceeded the threshold amount of usage data, initiating creation of an instance process operating outside the enterprise network, and operating the application via the instance process.

Another example embodiment may provide an apparatus that includes a memory configured to store usage data of at least one application operating in an enterprise network, and a processor configured to identify the at least one application operating on the enterprise network, retrieve the current usage data of the at least one application from the memory, compare the current usage data of the at least one application to a threshold amount of usage data to determine whether the application has exceeded the threshold amount of usage data, initiate creation of an instance process operating outside the enterprise network, and operate the application via the instance process.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments of the present disclosure provide a system, method and/or device configured to perform the dynamic migrating and provisioning of cloud application processing, cloud storage and cloud virtual hard disks (VHDs). Automatically migrating an application, cloud storage and VHDs may be achieved by auditing the available application processing and storage accessible to the enterprise infrastructure.

Figure 1:
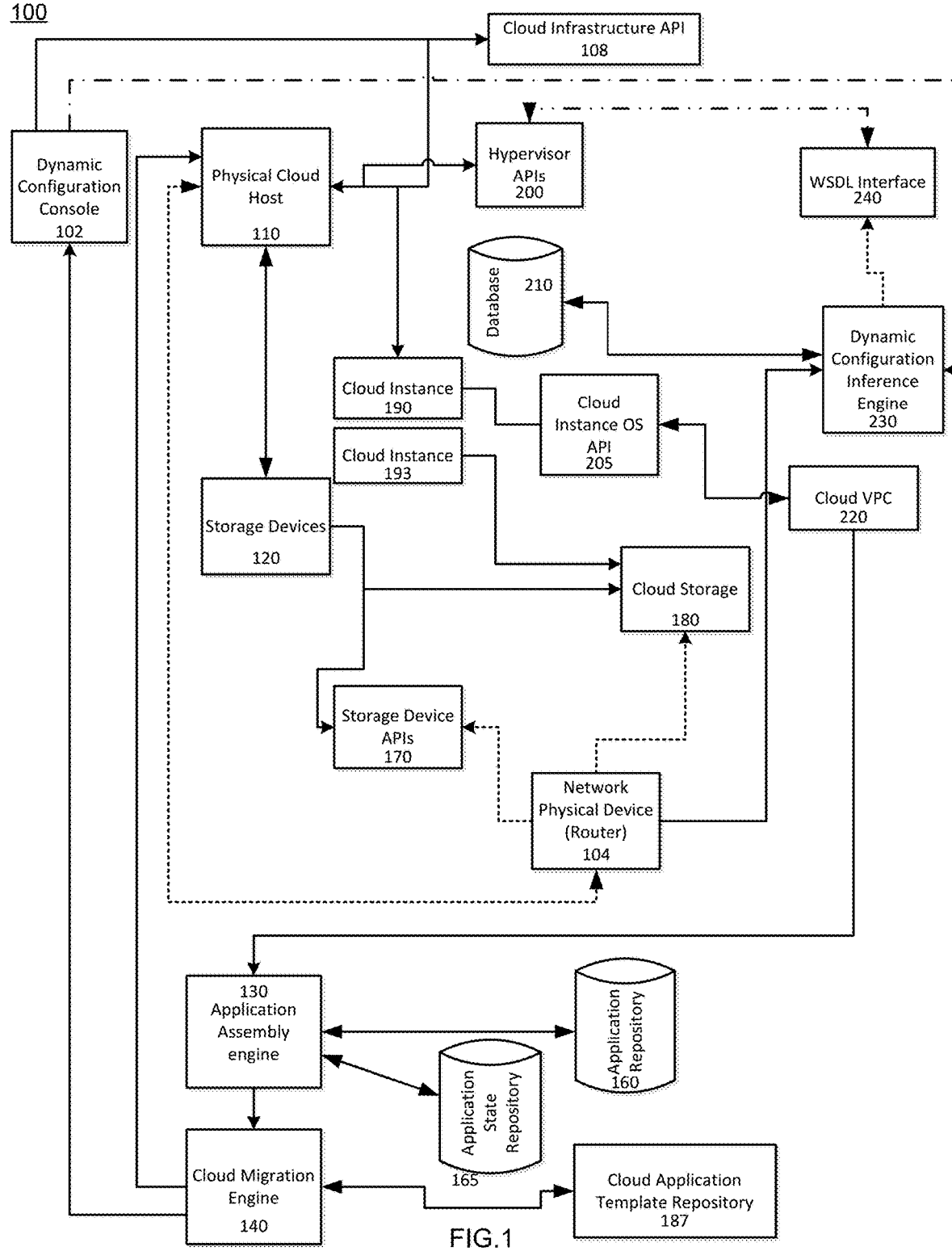
FIG. 1 illustrates an example network system of an enterprise application cloud migration procedure according to example embodiments of the present application.

FIG. 1 illustrates a logic diagram of a cloud migration machine communication interface 100 of a virtual storage configuration. Referring to FIG. 1, a dynamic configuration console 102 provides a computing function interface that identifies migration potential of active applications and upcoming application operated by the virtual machines. In general computing, a hypervisor, also called a virtual machine manager (VMM), is one of many hardware virtualization techniques allowing multiple operating systems, termed "guests", to run concurrently on a host computer device. The very term "hypervisor" is conceptually one level higher than a supervisory program. The hypervisor presents to the guest operating systems a virtual operating platform and manages the execution of the guest operating systems. Multiple instances of a variety of operating systems may share the virtualized hardware resources. Hypervisors are very commonly installed on server hardware, with the function of running guest operating systems that act as servers.

The system configuration or cloud migration illustrated in FIG. 1 is migrating applications, which are executed within a virtual machine container(s) from an enterprise virtual infrastructure to the cloud. This migration may be performed statically and/or dynamically to ensure uninterrupted service to the enterprise users. In one example, a need to migrate is identified based on predetermined migration data, then a container in the cloud may be initiated to host the application utilizing a common data store that can either be in an enterprise or in the cloud.

In operation, the cloud infrastructure API 108 may provide an interface for an application to communicate with enterprise applications and cloud operating systems and infrastructure. The user may navigate to the configurations console 102 and may be presented with a list of available applications as populated by the application repository 160. The user may select from the list of applications which applications they would like to migrate in the console 102. The application assembly engine 130 provides the console 102 with a list of virtual machines (VMs) that need common storage 120. The user interface receives a message from the console 102 to verify which records from the storage APIs 170 have completed this task. The console 102 performs an update by creating a Javascript object notation (JSON) message to the application state repository 165 that all applications have data stored in the storage device 120. The dynamic configuration inference engine 230 gathers data from the hypervisor APIs 200 to monitor a state of the application container in the form of a VM that is operating to support the application(s).

The present state may include variables, such as memory and CPU allocation identified by the hypervisor, which is identified in terms of utilization. The inference engine 230 is provided with detailed application (VM) state information by the console 102 monitoring the APIs 200. The cloud migration engine 140 prepares a cloud instance version of each VM by importing a copy of the VM into the cloud utilizing the cloud API 205, which monitors, manages and services the cloud instances 190 and 193. When a VM that contains a selected application is audited and determined to be within a predefined allocation amount (i.e, 80%, 90%, 95%, etc.) of allocation of memory or CPU usage, then the migration engine 140 receives a message from the inference engine 230 of the extreme condition or the need to reallocate resources (e.g., memory, CPU, storage, etc.). The cloud migration engine 140 then initiates a message to spin-up (i.e., replicate) the imported VM in the form of a cloud instance 190, 193 and 317-320 (see FIG. 2).

Figure 2:
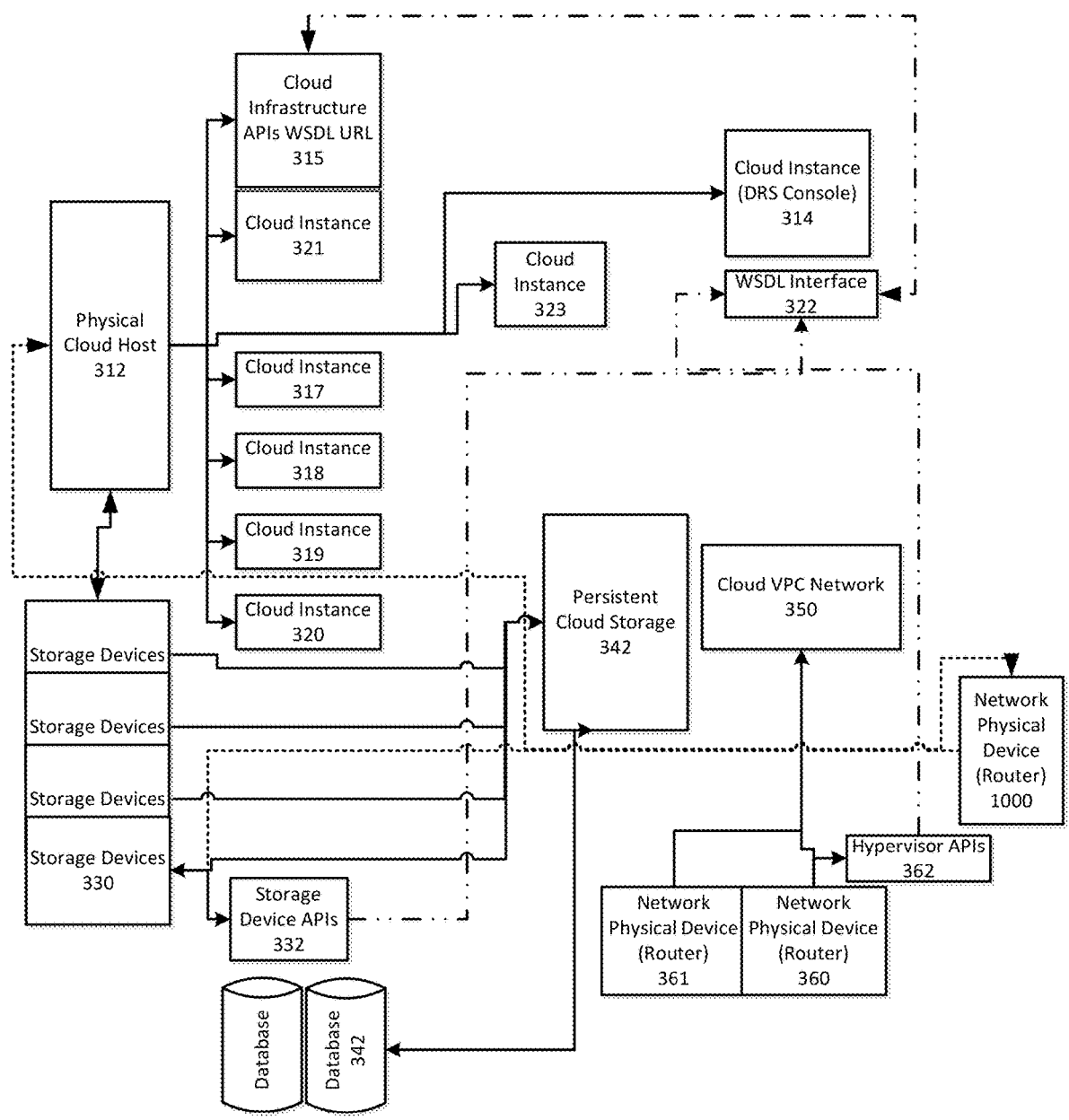
FIG. 2 illustrates an example network architecture of cloud instances according to example embodiments of the present application.

The migration engine 140 verifies via the cloud storage 180 that a mounted connection exists by the cloud instance(s) 190, 193 and 317-320 via a storage API (discussed in FIG. 2). The console 102 receives via a JSON message from the migration engine 140 that the cloud instances 190, 193 and 317-320 are operational and mounted. The migration engine 140 transmits a message to the hypervisor API 200 to spin down the VM version of the application container due to the cloud migration. The process may be reversed by either the console 100 or the cloud instance DRS console (see 314 of FIG. 2).

The physical cloud host 110 may be a computer processor or computing device configured to receive the requests and initiative messages from the enterprise devices operated by the hypervisor. The database 210 stores the know inferences and rules used to identify an application's status and criteria for cloud migration that may be used as the basis for positive migration inferences. The web services description language (WSDL) interface 240 is used by the inference engine 230 to establish a communication session with the hypervisor APIs 200. The virtual private cloud VPC 220 is a portal to connect the cloud APIs 205 to the assembly engine 130. The cloud application template repository 187 provides one or more templates which may be referenced to identify whether a migration will likely succeed based on known templates and previous migration efforts. The application state repository 165 stores the present state of the hypervisors both before and after migration efforts so migration and reverse migration may be performed effectively and seamlessly. The physical router 104 provides the physical routing of messages from the enterprise/hypervisor computing platforms and operating systems to the servers and other physical devices in the cloud.

FIG. 2 illustrates an example logic diagram 200 of cloud instances operating in the cloud. Referring to FIG. 2, the various cloud instances 317-321 may be virtual machines (Guest) that operate in the cloud. A physical cloud host 312 may include a hypervisor that hosts guests within a cloud infrastructure, such as AMAZON AWS or MICROSOFT Azure. The storage device APIs 332 may be application interfaces for a particular datastore in a physical network, virtual infrastructure and/or cloud infrastructure such as AMAZON AWS. Persistent cloud storage 342 may be storage that does not go away when a cloud instance starts, stops, is reset, deleted, etc.

The database may store data in the persistence cloud storage. The network physical device router 1000 is a physical router for routing network traffic. The hypervisor APIs 362 are an application interface for the host that the guest (VM) is hosted. Cloud infrastructure API/WSDL/URL 315 may represent the Internet URL that one would use to access a cloud provider's API. The cloud instance DRS console 314 is a migration console that will permit the user of the system to configure the system to migrate applications. The storage devices 330 provide storage for any devices physical or virtual operating in the cloud. The cloud network may have its own physical routers 360/361. The cloud instance 323 may be a separate instance that is used to provide a physical cloud host or console with access to the hosted applications. The cloud VPC network 350 is a private network application that may be used to authenticate and identify network users and their corresponding profiles and instances. The web service description language (WSDL) interface 322 offers an interface to the cloud console 314.

According to example embodiments, a migration audit may be performed automatically to migrate an enterprise application to the cloud. The inference engine 230 may request application status information of all VMs currently operating on the enterprise from the application assembly engine 130 to determine if a migration is needed. The applications that are having limited data access, overuse, specific application types, etc., may be readily identified based on utilization thresholds compared to the applications operation currently logged. The applications eligible for migration will have a predetermined amount of user and/or utilization (e.g., memory, data storage, CPU).

The device used to operate an application supported by a VM or a cloud instance may be a computer, laptop, mobile, wireless or cellular phone, a PDA, a tablet, a client a server or any device that contains a processor and/or memory, whether that processor or memory performs a function related to an embodiment of the application.

Figure 3:
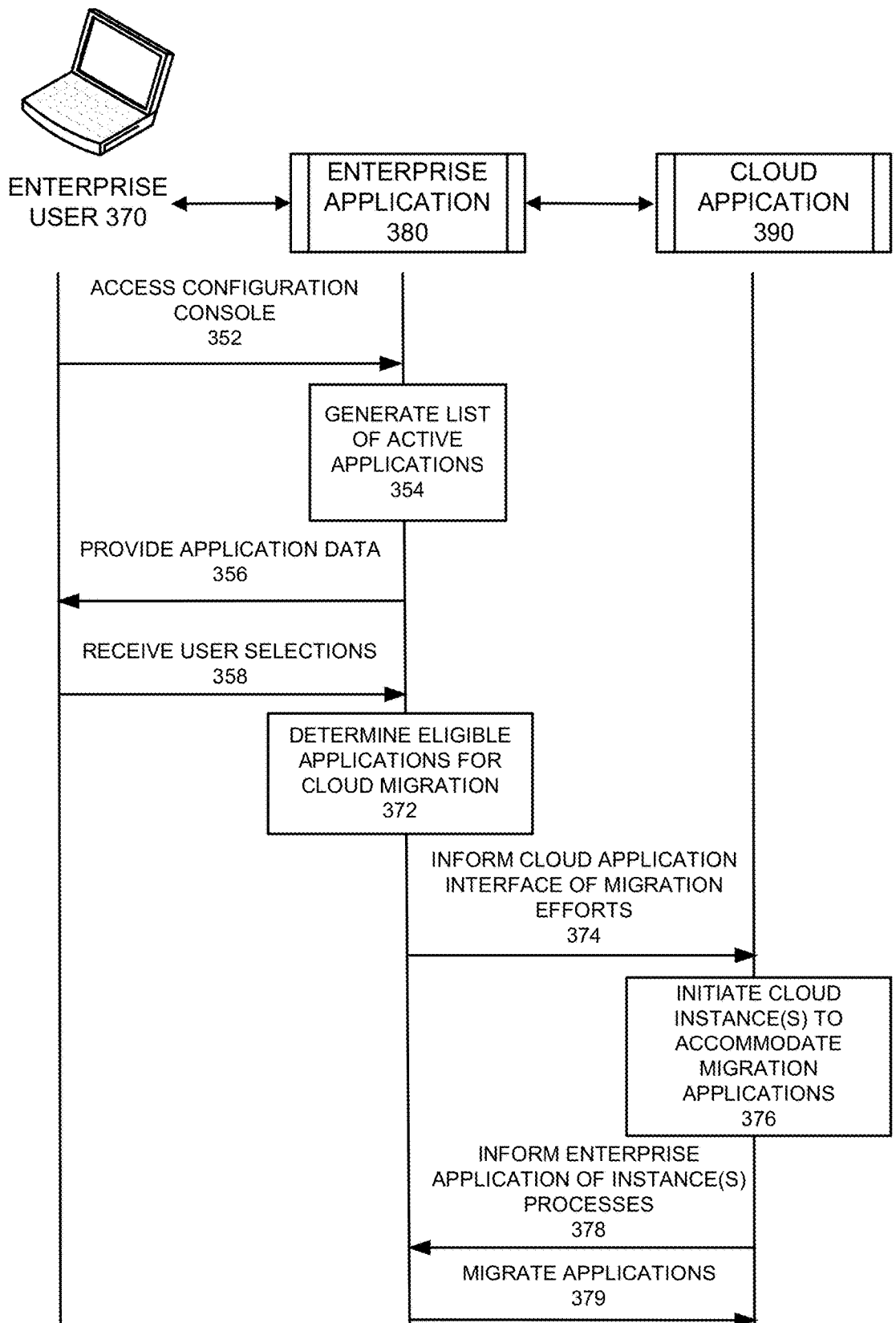
FIG. 3 illustrates an example system signaling communication model according to example embodiments of the present application.

FIG. 3 illustrates a communication network message flow diagram according to example embodiments. Referring to FIG. 3, the diagram 395 provides an example where an enterprise user 370 may access one or more enterprise applications 380, and those application may be migrated to a cloud application 390. In one example, the user may access the configuration console 352, which may be a portal or user interface that provides access to the applications currently operating in the enterprise which are operated by VMs. The list of applications and their corresponding resource usage information may be generated 354 for a user to verify or for an automated application to initiate an automated migration effort to the cloud based on one or more portions of usage criteria information. The criteria may be certain thresholds of data storage, memory and CPU utilization that when exceeded or near exceeded causes a migration effort to occur automatically of one or more applications. The application data may be provided to the user interface 356 and the user may confirm selections or make manual selections as to the applications that should be migrated to the cloud and removed from the enterprise network.

The enterprise application 380 may be a hypervisor application or other management application that is responsible for identifying the present status of any of the VMs operating on the enterprise network. The application may determine all the eligible applications that should be migrated to the cloud 372 based on the predetermined threshold comparison efforts of the known thresholds to the application's present or past usage figures. The enterprise hypervisor application 380 may then transmit a message to the cloud application that certain applications qualify for migration 374. In response, the cloud's server or application may then initiate one or more processes or instances 376 that represent the migrated applications in the cloud and not in the enterprise. Those instances can then be confirmed 378 and used to migrate the applications 379 so the enterprise applications may be terminated to make enterprise resources available for other purposes.

Figure 4:
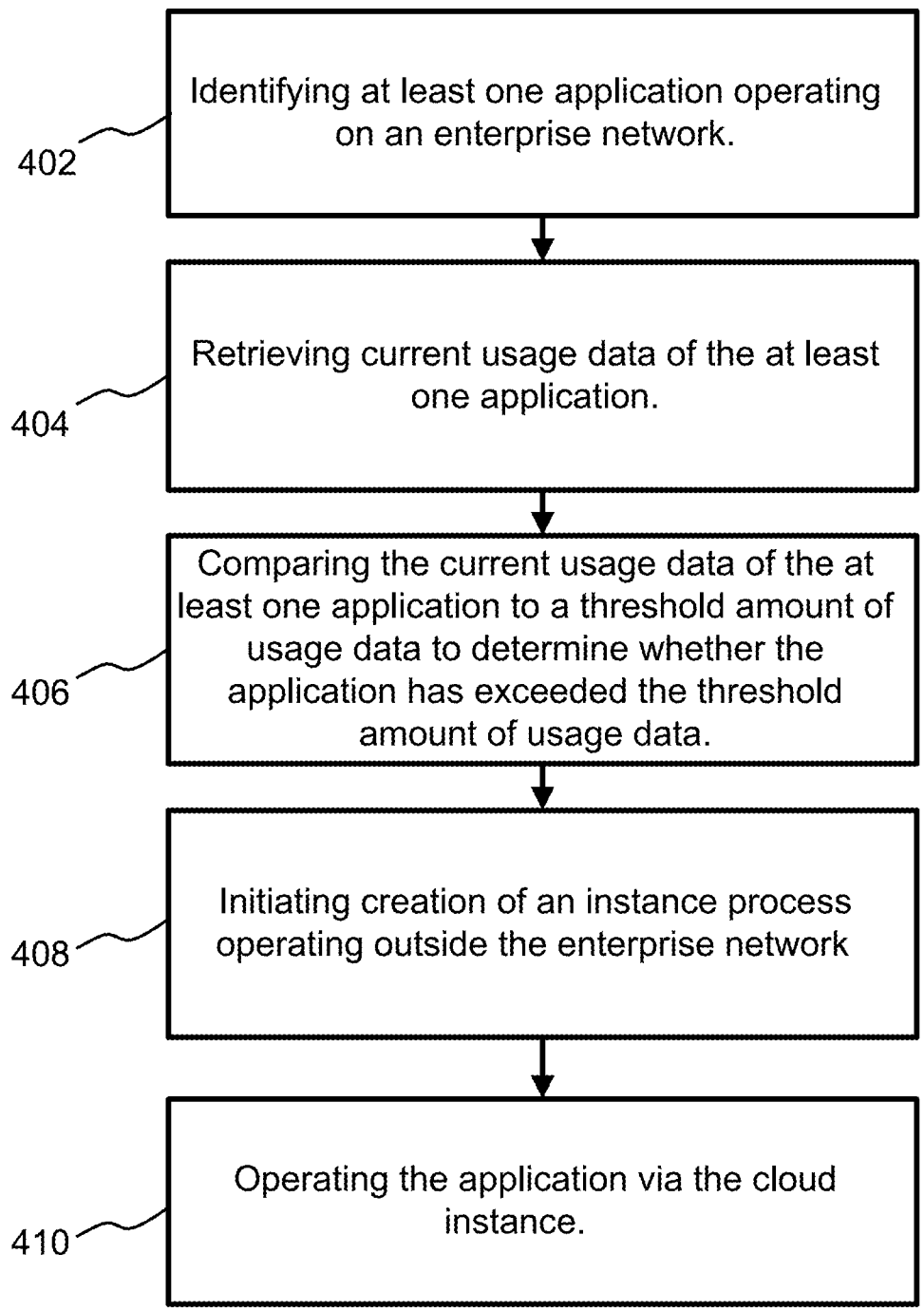
FIG. 4 illustrates a flow diagram of an example method according to an example embodiment of the present application.

FIG. 4 illustrates an example flow diagram 400 of a method of operation according to example embodiments. Referring to FIG. 4, the cloud migration system example operation may include identifying at least one application operating on an enterprise network at operation 402. The number of applications currently operating may vary but one application is enough for a migration effort. The method may also include retrieving current usage data of the at least one application at operation 404 and comparing the current usage data of the at least one application to a threshold amount of usage data to determine whether the application has exceeded the threshold amount of usage data at operation 406. If the usage data of any of the audited application usage figures are near or exceeding (within 5%) of the predetermined threshold amount (i.e., 80-95%), then those applications causing such a utilization overload will be considered candidates for migration. The process also includes initiating creation of an instance process operating outside the enterprise network at operation 408 and operating the application via the cloud instance at operation 410.

Figure 5:
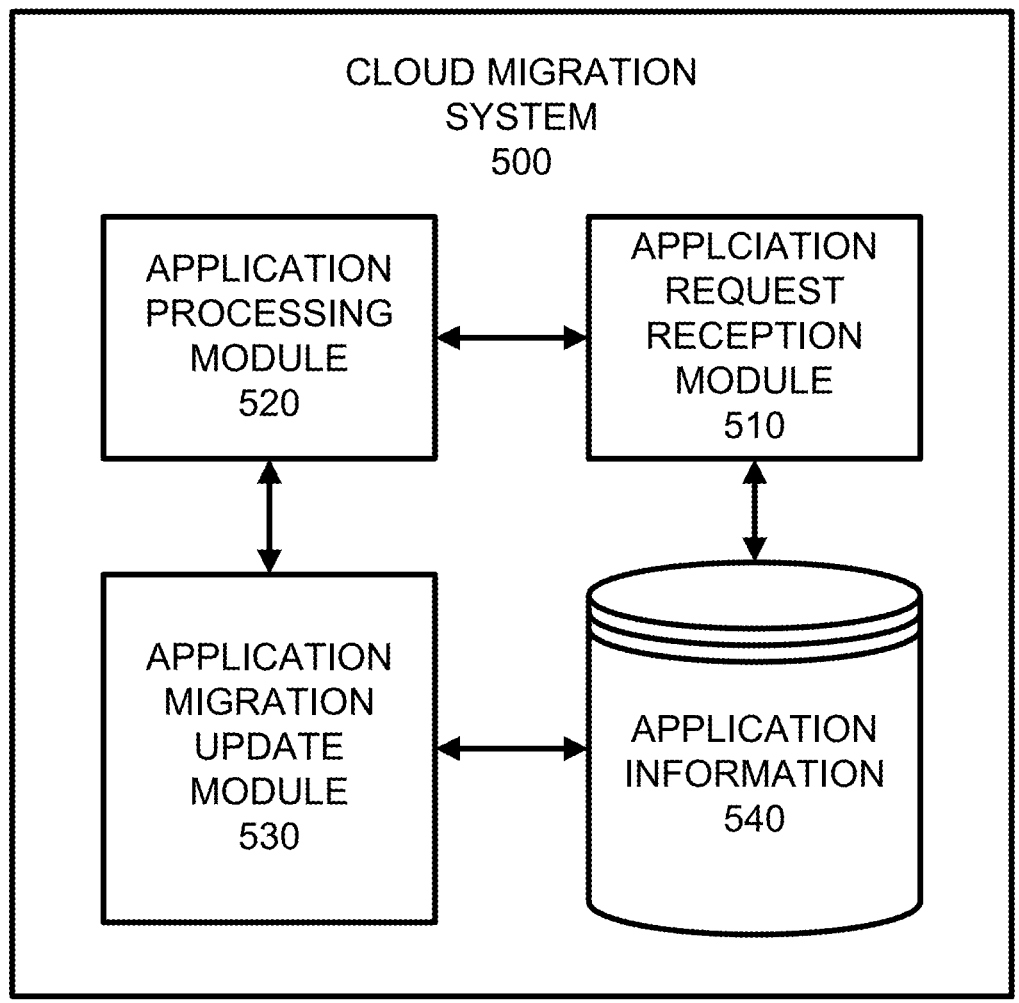
FIG. 5 illustrates a system configuration that is configured to perform one or more operations corresponding to the example embodiments.

FIG. 5 illustrates a single entity or multi-entity system configured to perform one or more operations corresponding to the example embodiments described in the disclosure. Referring to FIG. 5, the cloud migration system 500 may provide an application request reception module 510 which is configured to receive a request for an application that is likely to require migration from the enterprise to the cloud computing environment. The process may also include identifying at least one application operating on the enterprise network and retrieving current usage data of the at least one application. The usage data may dictate that migration is necessary. As a result, the current usage data of the at least one application is then compared to a threshold amount of usage data to determine whether the application has exceeded the threshold amount of usage data, via the application processing module 520. The result may require a migration to the cloud and as a result, the creation of an instance process operating outside the enterprise network may be initiated via the application migration update module 530. The usage data thresholds and requirements may be stored in the application information database 540 and referenced for migration decision purposes. Thereafter the application may be operated via the cloud instance outside the enterprise network.

The at least one application may include a plurality of different applications each utilizing a certain amount of memory usage, disk space usage and processor usage and the plurality of applications are hosted by at least one virtual machine operating on the enterprise network. In addition, instructions may be received of a confirmation that the instance process is currently operational and the at least one application hosted by a virtual machine may then be terminated. The instance process is hosted in a cloud network on a cloud server that is separate from the resources of the enterprise network. The current usage data of the at least one application may include requesting the current usage data from a hypervisor application programming interface (API) that is responsible for keeping track of the various applications. The usage data may include at least one of a memory usage, a disk space usage and a processor usage.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 6 illustrates an example network element 600, which may represent any of the above-described network components 102 and 103, etc.

Figure 6:
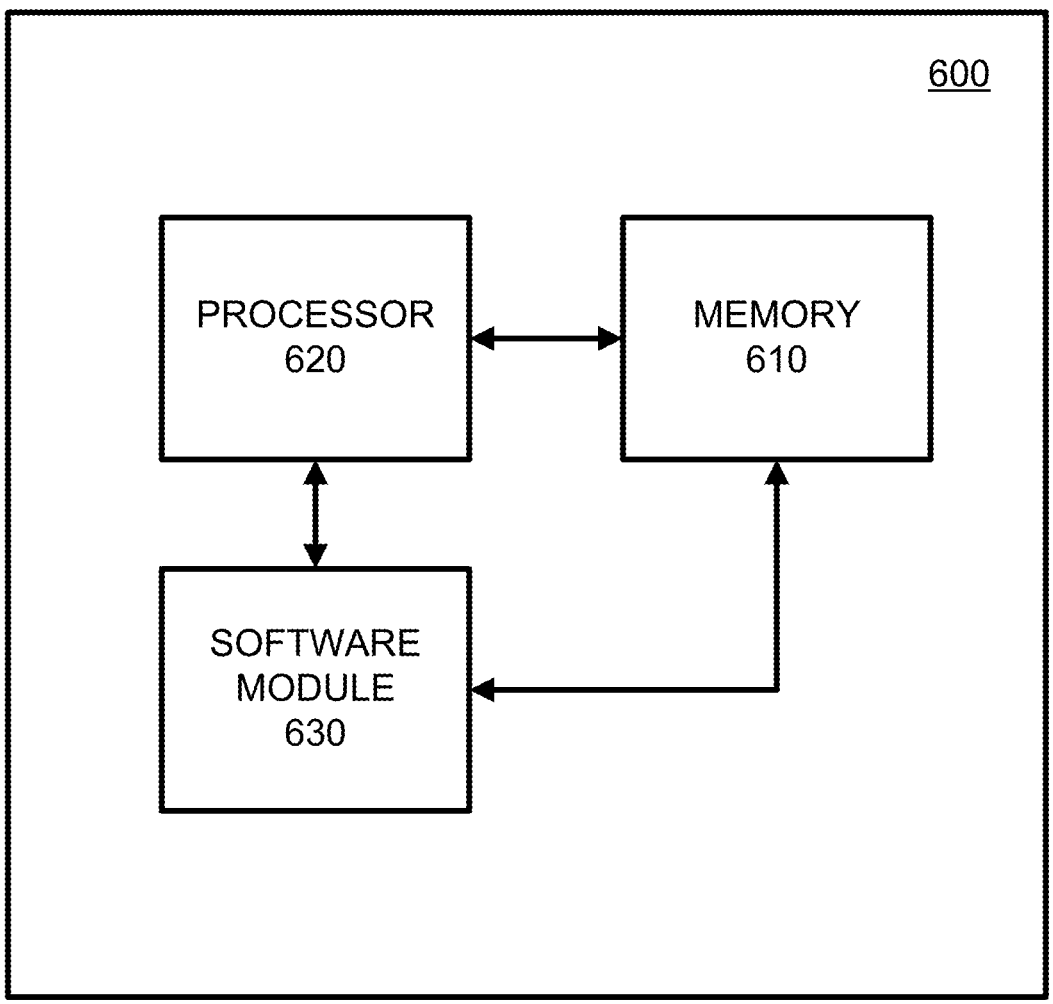
FIG. 6 illustrates an example network entity device configured to store instructions, software, and corresponding hardware for executing the same, according to example embodiments of the present application.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. The computer readable medium may be a non-transitory computer readable medium that includes tangible hardware components in addition to software stored in memory. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the system of FIG. 5 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   identifying a plurality of applications operating on an enterprise network and hosted by a virtual machine;
   retrieving current usage data of the plurality of applications by requesting the current usage data from a hypervisor application programming interface (API);
   identifying the current usage of the plurality of applications, the current usage data comprising at least one of memory resources and processor resources of the virtual machine, wherein the plurality of applications and the current usage data of the plurality of applications is identified from a list;
   comparing the current usage data of an application among the plurality of applications to a threshold amount of usage data to determine whether the application has exceeded the threshold amount of usage data;
   identifying the application is experiencing one or more of limited data access and application overuse;

determining the current usage of the application has exceeded the threshold amount of usage data and is a candidate for migration;
receiving a request to process a migration for the application;
initiating creation of an instance process outside the enterprise network as a migration location and an application instance of the application;
receiving confirmation that the instance process is currently operational and has a mounted connection;
migrating the application to the instance process;
transmitting a message to the hypervisor API to terminate the application operating in the enterprise network hosted by the virtual machine;
terminating the application operating in the enterprise network hosted by the virtual machine; and
operating the application via the instance process in a cloud network.

2. The method of claim 1, wherein the application utilizes a certain amount of memory usage, disk space usage and processor usage of the virtual machine.

3. The method of claim 2, wherein the plurality of different applications are hosted by the virtual machine operating on the enterprise network.

4. The method of claim 1, wherein the instance process is hosted in a cloud network.

5. The method of claim 1, wherein the usage data further comprises a disk space usage.

6. An apparatus comprising:
a memory configured to store current usage data of a plurality of applications operating in an enterprise network; and
a processor configured to
identify the plurality of applications operating on the enterprise network and hosted by a virtual machine;
retrieve the current usage data of the plurality of applications from the memory via a request for the current usage data obtained from a hypervisor application programming interface (API);
identify the current usage of the plurality of applications, the current usage data comprising at least one of memory resources and processor resources of the virtual machine, wherein the plurality of applications and the current usage data of the plurality of applications is identified from a list;
compare the current usage data of an application to a threshold amount of usage data to determine whether the application has exceeded the threshold amount of usage data;
identify the application is experiencing one or more of limited data access and application overuse;
determine the current usage of the application has exceeded the threshold amount of usage data and is a candidate for migration;
receive a request to process a migration for the application;
initiate creation of an instance process outside the enterprise network as a migration location and an application instance of the application;
receive confirmation that the instance process is currently operational and has a mounted connection;
migrate the application to the instance process;
transmit a message to the hypervisor API to terminate the application operating in the enterprise network hosted by the virtual machine;
terminate the application operating in the enterprise network hosted by the virtual machine; and
operate the application via the instance process in a cloud network.

7. The apparatus of claim 6, wherein the application utilizes a certain amount of memory usage, disk space usage and processor usage.

8. The apparatus of claim 7, wherein the plurality of different applications are hosted by the virtual machine operating on the enterprise network.

9. The apparatus of claim 6, wherein the instance process is hosted in a cloud network.

10. The apparatus of claim 6, wherein the usage data further comprises a disk space usage.

11. A non-transitory computer readable storage medium configured to store instructions that when executed cause a processor to perform:
identifying a plurality of applications operating on an enterprise network and hosted by a virtual machine;
retrieving current usage data of the plurality of applications by requesting the current usage data from a hypervisor application programming interface (API);
identifying the current usage of the plurality of applications, the current usage data comprising at least one of memory resources and processor resources of the virtual machine, wherein the plurality of applications and the current usage data of the plurality of applications is identified from a list;
comparing the current usage data of an application among the plurality of applications to a threshold amount of usage data to determine whether the application has exceeded the threshold amount of usage data;
identifying the application is experiencing one or more of limited data access and application overuse;
determining the current usage of the application has exceeded the threshold amount of usage data and is a candidate for migration;
receiving a request to process a migration for the application;
initiating creation of an instance process outside the enterprise network as a migration location and an application instance of the application;
receiving confirmation that the instance process is currently operational and has a mounted connection;
migrating the application to the instance process;
transmitting a message to the hypervisor API to terminate the application operating in the enterprise network hosted by the virtual machine;
terminating the application operating in the enterprise network hosted by the virtual machine; and
operating the application via the instance process in a cloud network.

12. The non-transitory computer readable storage medium of claim 11, wherein the application utilizes a certain amount of memory usage, disk space usage and processor usage.

13. The non-transitory computer readable storage medium of claim 12, wherein the plurality of different applications are hosted by the virtual machine operating on the enterprise network.

14. The non-transitory computer readable storage medium of claim 11, wherein the instance process is hosted in a cloud network.

15. The non-transitory computer readable storage medium of claim 11, wherein the usage data further comprises disk space usage.

* * * * *